United States Patent [19]

Lear

[11] 3,934,675

[45] Jan. 27, 1976

[54] JET ENGINE NOISE SUPPRESSOR

[75] Inventor: William P. Lear, Verdi, Nev.

[73] Assignee: Lear Avia Corporation, Reno, Nev.

[22] Filed: May 20, 1974

[21] Appl. No.: 471,476

[52] U.S. Cl. .......... 181/33 HC

[51] Int. Cl.[2] .......... F02K 1/26

[58] Field of Search ...... 181/33 HB, 33 HC, 33 HD, 181/43, 51, 72; 239/265.13, 265.17

[56] References Cited

UNITED STATES PATENTS

| | | | |
|---|---|---|---|
| 2,990,905 | 7/1961 | Lilley | 181/43 |
| 3,027,710 | 4/1962 | Maytner | 181/33 HC UX |
| 3,153,319 | 10/1964 | Young et al. | 181/43 X |
| 3,227,240 | 1/1966 | Lee et al. | 181/33 HC UX |
| 3,495,682 | 2/1970 | Treiber | 181/33 HC UX |
| 3,579,993 | 5/1971 | Tanner et al. | 181/33 HC X |
| 3,599,749 | 8/1971 | Millman | 181/33 HC |

OTHER PUBLICATIONS

National Advisory Committee for Aeronautics Technical Note 4317; "Turbojet Engine Noise Reduction With Mixing Nozzle-Ejector Combinations," Aug. 1958, Washington, D.C., p. 19.

*Primary Examiner*—Stephen J. Tomsky
*Assistant Examiner*—John F. Gonzales
*Attorney, Agent, or Firm*—Albin H. Gess

[57] ABSTRACT

The sound suppressor hereof significantly reduces the operational noise of jet engines, particularly on take-off and approach of jet aircraft. The system hereof is simple, effective, and relatively low in cost. It adds relatively little weight to the engine assembly, and absorbs negligible power. The suppressor comprises convolutions of sheet metal that surround the exhaust nozzle, and direct cool air to the outer periphery of the engine exhaust gases. The result is a reduction of jet engine noise sufficient to meet the Federal Air Regulations Standards as currently established by the FAA. The suppressor is particularly advantageous for business-type executive jet aircraft.

15 Claims, 6 Drawing Figures

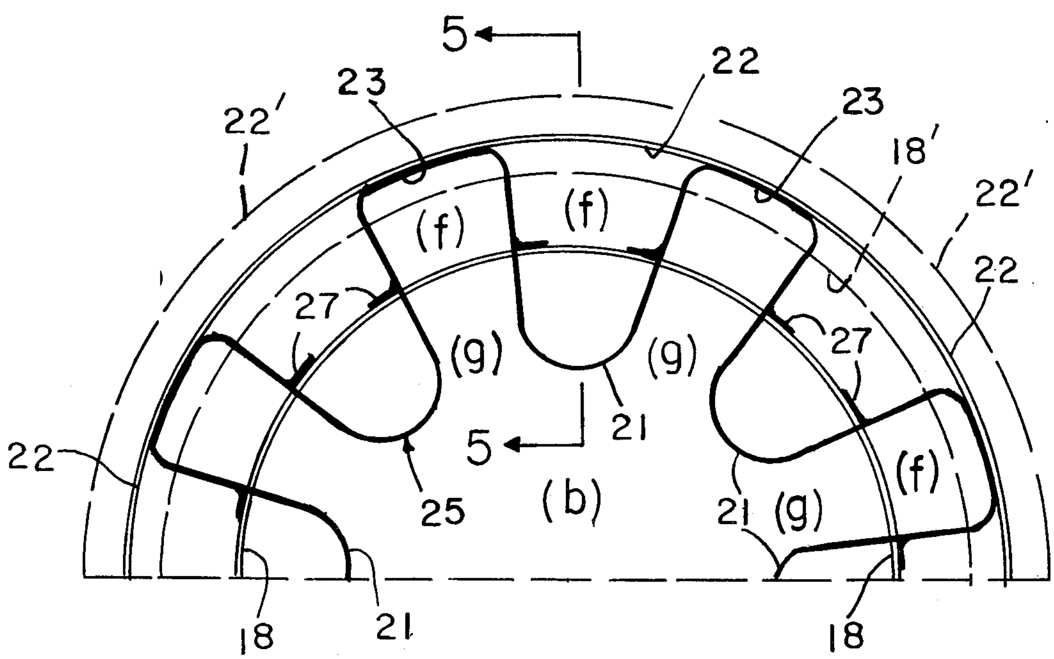

JET ENGINE NOISE SUPPRESSOR

BACKGROUND AND SUMMARY OF THE INVENTION

There is a world-wide drive by governments to greatly reduce the noise of jet aircraft under their jurisdiction, particularly on takeoff and landing approaches. The FAA requirements are Part 36 of its Federal Air Regulations; International regulations are in Annex 16 of ICAO.

The sound suppressors of the present invention add relatively little to engine weight, drain negligible power, and are relatively inexpensive to fabricate and install. A series of metal convolutions are arranged about the engine exhaust gases, to provide cool air directed to intermix peripherally with the hot central gases, in a manner that materially reduces the jet noise condition.

An exhaust tailpipe is integrated with the suppressor, and is a replacement assembly for the original exhaust nozzle. The nacelle remains unaltered. Only about 14 pounds is added overall per engine to GE Model CJ-610 engines. The FAR 36 noise reductions are fully met by the suppressors hereof. They are rugged, and do not deteriorate despite their location in the hot exhaust region of the engine.

THE DRAWINGS

DESCRIPTION OF THE INVENTION

Figure 1:
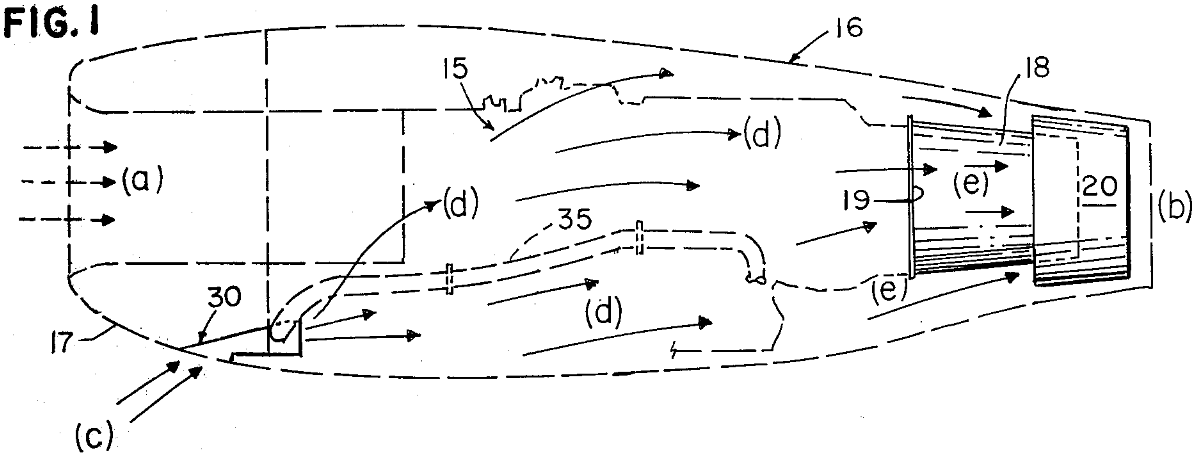
FIG. 1 is a schematic diagram of a jet engine containing the jet noise suppressor of the invention.

The jet engine 15 is mounted on the aircraft within a conventional nacelle assembly 16, as indicated in FIG. 1. Engine 15 is an axial flow type, with its air intake through nose cap 17, indicated by the set of arrows *a.* The hot exhaust gases from engine 15 exit outboard at *b*, through conical exhaust nozzle 18, also termed the tailpipe. The sound suppressor 20 is attached to, and forms an integral assembly with the tailpipe 18. A flange 19 on tailpipe 18 is used to securely bolt it to the engine. In practice, suppressor 20 is supplied together with a replacement tailpipe, making for efficient installation. For a twin jet plane, as a Learjet, there are two engine assemblies, one on each side. It would use a sound suppressor (20) for each engine.

An air scoop 30 is positioned at the forward end of the nacelle, with its entry air *c* at the bottom of nose cap 17. The "internal" air *c* passes through scoop 30 into the bay area *d* of the engine assembly 15,16. Such air flow *d* cools the engine exterior, and while still cold flows between tailpipe 18 and the suppressor 20 mounted thereabout, as indicated at (*e*). A cooling duct or hose 35 conducts cold air between a wall of scoop 30 and the starter generator (not shown) of engine 15.

Figure 2:
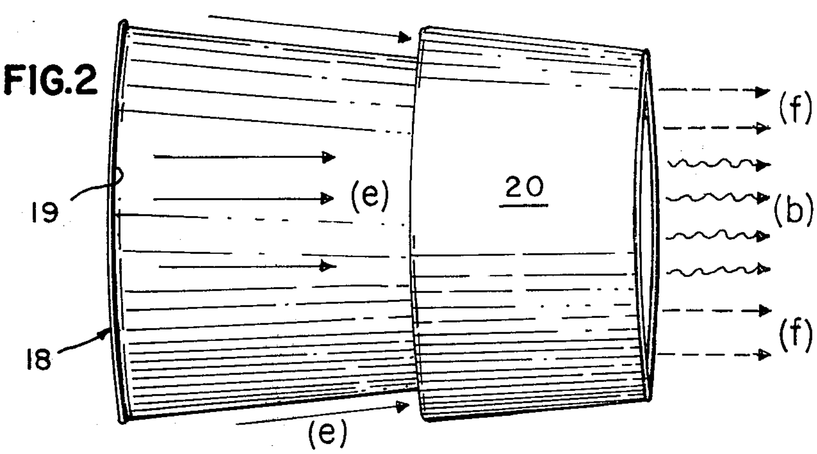
FIG. 2 is an elevational view, in partial perspective, of the engine tailpipe integrated with the sound suppressor structure.

FIG. 2 illustrates air and gas relations in general at sound suppressor assembly 18,20. Cool air *e* flows about the exhaust nozzle 18 into the region between it and the conical envelope (20), for the sound suppression action to be described. A high temperature, high pressure exhaust thrust column of gases *b* flows centrally through the suppressor 20. Its radially outer regions *f,f* are laminations of cold air flow, generated from the *e* air, that interact with the envelope of exhaust gases thereat.

Figure 3:
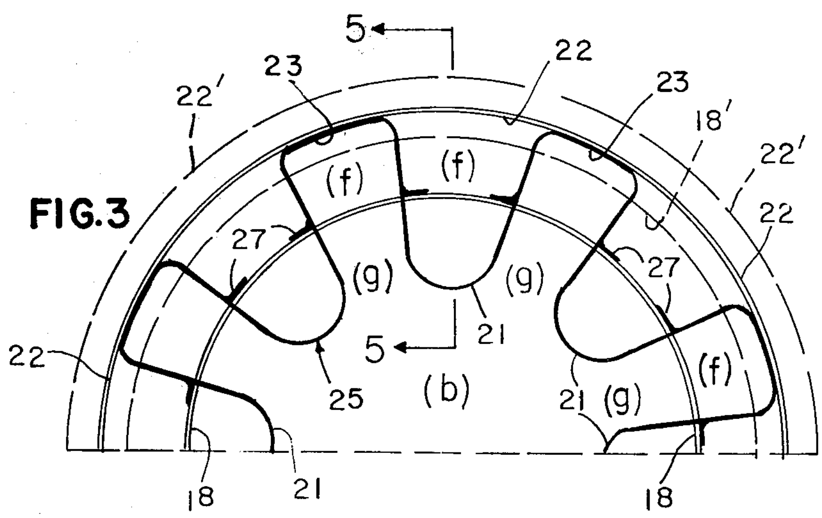
FIG. 3 is a partial end or outboard view into the tailpipe sound suppressor assembly hereof.
Figure 4:
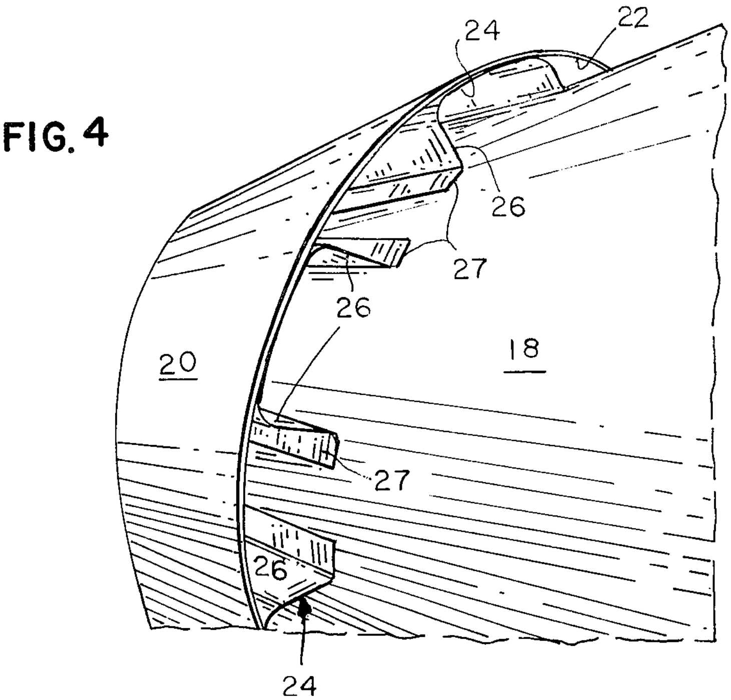
FIG. 4 is a partial elevational view, in perspective, of the noise suppressor assembly.
Figure 5:
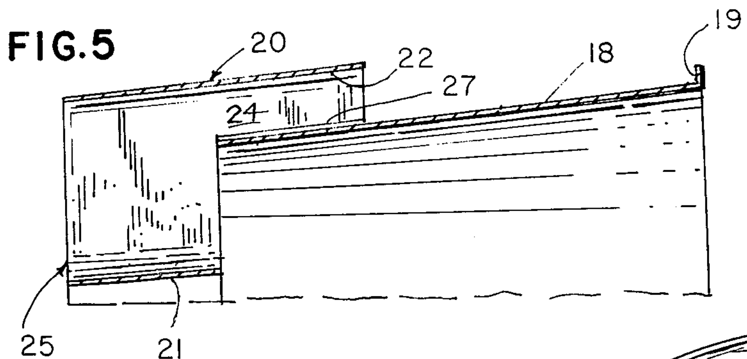
FIG. 5 is a cross-sectional view through the sound suppressor, taken along the line 5—5 of FIG. 3.
Figure 6:
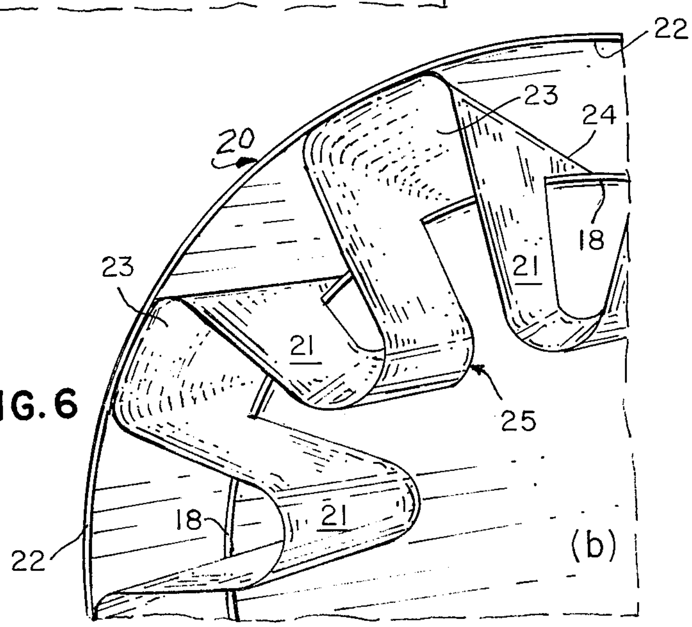
FIG. 6 is a perspective view from the outboard end, of the sound suppressor, in partial extent.

FIGS. 3 through 6 show the exemplary sound suppressor 20 assembled with exhaust nozzle 18. Actually, the sound suppressor assembly comprises both the tailpipe 18 together with the conical surround 20 and the interconnecting convoluted sheet metal member 25. Member 25 comprises a number of lobes 21,21 at the outboard end, eight (8) in the assembly hereof. Lobes 21,21 extend from the conical surround 22 into the thrust column *b* of exhaust gas, as best seen in FIGS. 3 and 6. Dashed lines 18' and 22' in FIG. 3 represent the inner edges of the conical tailpipe 18 and surround 22 respectively.

Convoluted assembly 25 is constructed of sheet metal, such as No. 321 stainless steel. Its outboard section contains lobes 21,21 that are directed radially inward. The radially outer portions or seats 23,23 are spot welded to surround 22. In addition, the axially inward section 24,24 of lobe assembly 25 is welded to exhaust nozzle 18, as seen in FIG. 4. Extensions 24,24 of upper sections 23,23 of assembly 25 extend across to the edge of surround 22, and have dependent arms 26,26 that are spot welded along their extension 27 to tailpipe 18; see FIGS. 3 and 4. Depending arms 26,26 of extensions 24,24 permit the cool air *e* to pass between surround 22 and tailpipe 18 towards the outboard convolutions 21,23 of assembly 25, as will be now understood by those skilled in the art. The convoluted assembly 25 (FIG. 3) by means of lobes 21 and the axially inward sections 24 define a plurality of mixing channels identified as areas (f) and (g) in FIG. 3. Each channel has a pair of dependent arms or channel walls 26 (FIG. 4) that are supported by the exhaust nozzle 18. The lobes 21 connect respective pairs of channel walls 26 in the peripheral region of the exhaust gas flow of nozzle 18.

It is to be noted that the conical configuration of both tailpipe 18 and surround 22 are parallel, and the bottom edge of lobe 21 is parallel thereto; see FIG. 5. In this manner the axial and laminar flow of the cool air (*e*) and exhaust thrust air (*b*), particularly where they intermix, are maintained with minimum turbulence of flow. Further, minimum extraneous forces are thereby exerted on the suppressor assembly 25 from the air *e* flow, and the thrust air *b.*

The air flow into outboard section 21, 23 of assembly 25 is in cylindrical laminar form. This air *e* encloses the periphery of the exhaust gas thrust column *b*. The lobes 21 and seats 23 of suppressor assembly 25 at its outboard section cause an interaction of the outer regions *g* of the high pressure hot thrust gases eminating from the engine at *b* with the cool air *e* that is introduced about the hot jet blast. The resultant is to effectively attenuate the sound level. The intermixed gases at *g, g* interact to produce a substantial drop in the sound level thereat.

It is thought that a form of thermal transfer and frequency phase shift causes the engine noise suppression. Tests have been performed with the described sound suppressor on Learjet twin-engine aircraft Model 24D using General Electric engines, Model CJ610-6. These have rated engine thrust in the order of 3000 pounds. Noise level reductions as much as 30 percent were effected on takeoffs and approaches, with the corresponding Effective Perceived Noise level, based on FAA measurement procedures, reduced up to the order of 5 EPNdb. In fact, the sound suppressor hereof is being manufactured, and has obtained Certification from the FAA as meeting all requirements of its FAR 36 that governs aircraft noise levels. It also meets the International regulations, such as ICAO's Annex 16.

The sound suppresor hereof is more effective and lighter in weight than other types. It takes less power from the aircraft. It is more economical to fabricate, install and service. A total weight of about 14 pounds is added to each Model CJ610-6 engine. The original nacelle of the engine is utilized without modification.

The radial extent of lobes 21, 21 inwardly is determined by several factors. The more important one is that if they were extended too much they would be subject to deterioration due to the extremely hot exhaust gases having powerful thrust. As the sound phase displacements and noise reduction are primarily effected at the lamination boundaries between the cold air introduced by the sound suppressor about the cylinder of central hot gases at the exhaust, as described, the radial extent is secondary.

It is very important to have a rigid assembly, as the lobes 21,21 remain unsupported except by the attachment structure described including the spot welding of its upper sections 23,23 to the suppressor cone 22, and the rear extensions 26,26 welded between the suppressor cone 22 and the spaced tailpipe 18, as best seen in FIG. 4. It is also important to have a sufficient spot welding array and strength, as well as design of the basic metal and convolutions of the suppressor assembly, to minimize vibration and any possible interference with the effectiveness of exhaust nozzle 18. It is important to avoid vibration in the convolutions of the sound suppressor assembly, as their purpose is to attenuate noise without introducing any. Besides, vibration would weaken such metal assembly. The suppressor lobes 21,21 are in extreme thrust regions of the hot exhaust gases of the jet engines. With careful conventional design and construction the sound suppressors hereof can be made to effect their attenuation of the sound, as well as outlast the life of the engines on which they are installed.

What is claimed is:

1. A sound suppressor for a jet engine having an exhaust nozzle through which hot exhaust gases are thrust along its longitudinal axis from the engine, said sound suppressor, comprising:

a plurality of mixing channels arranged about the downstream exit of the exhaust nozzle receiving both the exhaust gases and cooling air for directing cool air into the peripheral regions of the exhaust gas flow, thereby effectively attenuating the sound output, said channels having respective channel walls extending into the peripheral region of the exhaust gas flow, each channel wall having a surface configuration perpendicular to the inside surface of the exhaust nozzle and parallel to the direction of the longitudinal axis.

2. A sound suppressor as claimed in claim 1, further including a plurality of lobes arranged about the exhaust nozzle, by connecting together pairs of said channel walls in the peripheral region of the exhaust gas flow.

3. A sound suppressor as claimed in claim 2, in which said channels and said lobes are formed in substantially continuous array.

4. A sound suppressor as claimed in claim 1, further including a sound coaxial about said exhaust nozzle, said surround being attached to said channel walls.

5. A sound suppressor as claimed in claim 1, further including a surround coaxial about said exhaust nozzle and attached thereto, said exhaust nozzle being of conical form, narrower at its outboard end, said surround being similarly shaped and mounted in substantially parallel relation with the nozzle.

6. The sound suppressor of claim 1 wherein said channel walls comprise 321 stainless steel.

7. A sound suppressor for a jet engine having an exhaust nozzle through which hot exhaust gases are thrust from said engine, said suppressor, comprising:

a convoluted assembly having a longitudinal profile parallel and coaxial to the longitudinal profile of said exhaust nozzle, said convoluted assembly comprising a plurality of dependant arms in sheet form, a portion of each arm lying in a radial plane of said exhaust nozzle and projecting beyond said exhaust nozzle in the gas flow direction, each arm being fastened to said exhaust nozzle along its non-projecting length, the projecting length of each arm extending across peripheral regions of the exhaust gas flow, and each pair of said plurality of dependent arms being joined together along their projection length, in the peripheral regions of said gas flow, to form a series of lobes about said exhaust nozzzle in said exhaust gas flow.

8. The sound suppressor of claim 7 wherein the profile of said exhaust nozzle and said convoluted assembly is conical, the narrower end being the outboard end.

9. The sound suppressor of claim 8 further comprising a surround, coaxial to said exhaust nozzle, supported by the arms of said convoluted assembly.

10. The sound suppressor of claim 9 wherein each arm is fastened to said exhaust nozzle along its non-projecting length by extensions of said arms spot-welded to said exhaust nozzle.

11. The sound suppressor of claim 10 wherein said surround is fastened to said support arms by spot-welds.

12. The sound suppressor of claim 7 further comprising a surround, coaxial to said exhaust nozzle, supported by the arms of said convoluted assembly.

13. The sound suppressor of claim 7 wherein said plurality of dependent arms and said series of lobes are formed in a substantially continuous array.

14. The sound suppressor of claim 13 wherein the profile of said exhaust nozzle and said convoluted assembly is conical, the narrower end being the outboard end.

15. The sound suppressor of claim 14 further comprising a surround, coaxial to said exhaust nozzle, supported by the arms of said convoluted assembly.

* * * * *